Oct. 8, 1935.　　　　L. L. DOLLINGER　　　　2,016,992
AIR FILTER
Filed Oct. 26, 1932　　　2 Sheets-Sheet 1
FIG.1.　　　　　　　FIG.2.
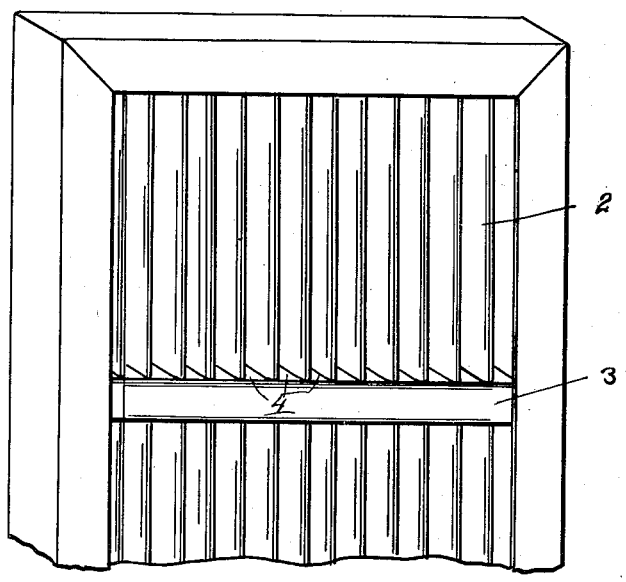
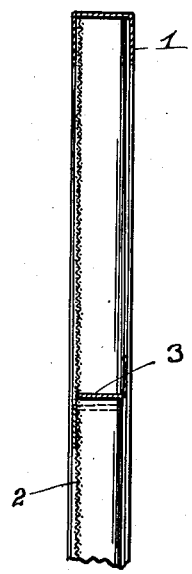
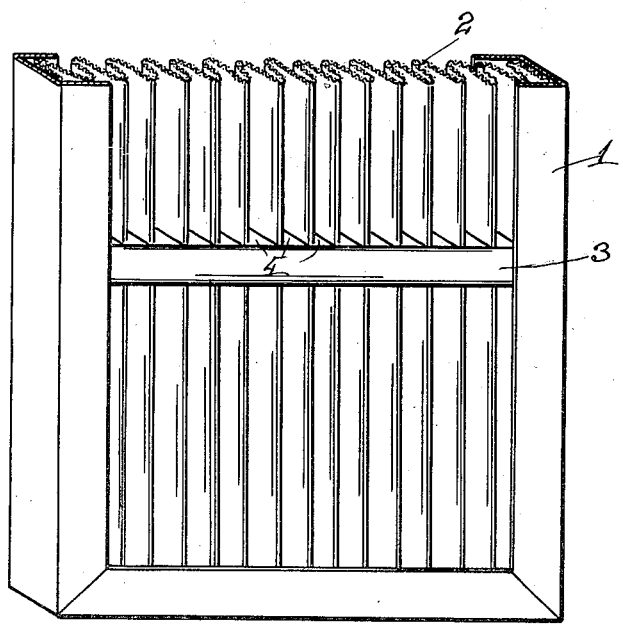
FIG.3.
INVENTOR
LEWIS L. DOLLINGER
BY
ATTORNEY Oct. 8, 1935. L. L. DOLLINGER 2,016,992
AIR FILTER
Filed Oct. 26, 1932 2 Sheets-Sheet 2

INVENTOR
LEWIS L. DOLLINGER
BY
ATTORNEY

Patented Oct. 8, 1935

2,016,992

UNITED STATES PATENT OFFICE 2,016,992

AIR FILTER

Lewis L. Dollinger, Rochester, N. Y., assignor to Staynew Filter Corporation, Rochester, N. Y.

Application October 26, 1932, Serial No. 639,669

4 Claims. (Cl. 183—71)

This invention relates to air and gas filters and has for its object to provide novel filtering panels of inexpensive simple construction and high efficiency with which filters of any desired capacity can be built up in a minimum space and at a minimum cost.

Another object of this invention is to so construct a filter by means of filtering panels that dirt laden panels can be readily replaced in the filter by clean panels with a minimum amount of labor and at a minimum cost.

Another object of this invention is to provide a filter construction which permits the withdrawal of one or more of the filter units without interfering with the operation of other filter units.

A further object of this invention is to automatically shut off the filter in case of fire in order to prevent the fire from passing thru the air duct and filtering panels mounted therein.

All these and other objects and attendant advantages of this invention will become more readily apparent from the detailed description thereof which follows, reference being had to the accompanying drawings in which Figure 1 is a perspective view partly broken away of one of the filter panels.

Figure 2 is a vertical section thereof.

Figure 3 is a perspective view of a portion of one of the spreaders used in the filtering panels.

In the several figures of the drawings like reference numerals indicate like parts.

The filter, forming the subject matter of my present invention, is built up in units in such a manner that when the filtering medium becomes laden with foreign matter so that it impairs the efficiency of the filter, the filtering medium can be easily replaced either in part or in whole. This is made possible by the use of a novel form of filtering unit which is made up in the form of the panel illustrated in detail in Figures 1 and 2.

The frame of this panel is rectangular in outline and is preferably made up of card board channel members 1, 1 which are suitably fastened together at the corners thereof. The frame may also be made up from one continuous length of channel members which is suitably cut and bent to form the desired rectangular shape. The card board stock from which the frame is made is sufficiently heavy to provide rigidity for the panel frame. Within the frame is mounted the filtering medium which consists of a thin filtering cloth 2 which is sized or treated so as to give it rigidity and stiffness. Folding the filtering cloth in the manner illustrated further increases the rigidity of the filtering sheet so that it will withstand the pressure of the air in its passage therethru. Of course folding the filtering cloth also increases the filtering area to the extent that the panel will efficiently filter air or gases at a low velocity.

The filter cloth is cemented into the inside of the channel members of the panel frame to seal the joint between the filtering cloth and the frame surrounding it. In order to hold the folds of the filtering cloth evenly spaced within the panel, a series of spacing bars 3, 3 are provided on each side of the panels. These spacing bars, as illustrated in perspective in Figure 3, are formed up of a strip of card board with a series of fingers 4, 4 cut out on one side thereof. The fingers are bent at right angles to the bar so that they project between the folds of the filtering cloth and hold them evenly spaced apart. The spacing bar is cemented to each side of the panel frame and in resting against the top of the folds, braces the folds against the pressure of the air which passes therethru. The spacing bars are provided on each side of the panels at suitable intervals in such a manner that the fingers 4, 4 thereof of opposing spacing bars are practically opposite each other and are in one bar at the bottom edge thereof and at the other bar at the top edge thereof. The natural tendency of the fingers to straighten out from their rectangular position on the bars thus moves the fingers of opposing bars together instead of away from each other. This arrangement of the fingers further increases the rigidity of the filtering cloth which adds to the mechanical resistance of the filter against the pressure under which the air or gas is forced therethru.

Figure 4:
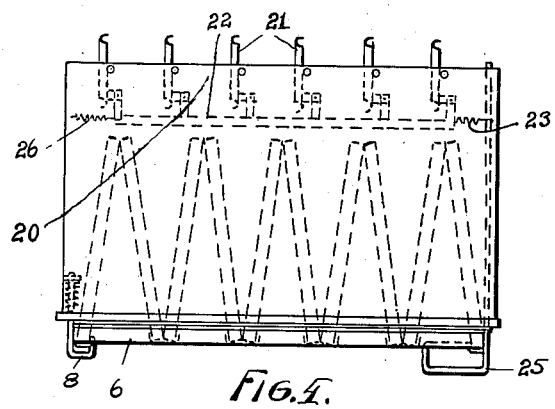
Figure 4 is a top plan view of a filter unit incorporating the filtering panels.
Figure 8:
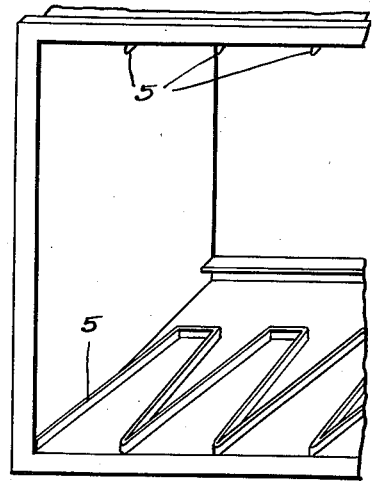
Figure 8 is a detail perspective view of a portion of the filter unit housing.
Figure 5:
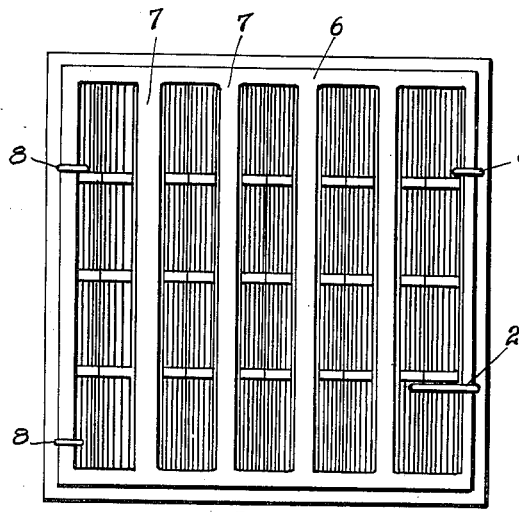
Figure 5 is a front elevation thereof.
Figure 7:
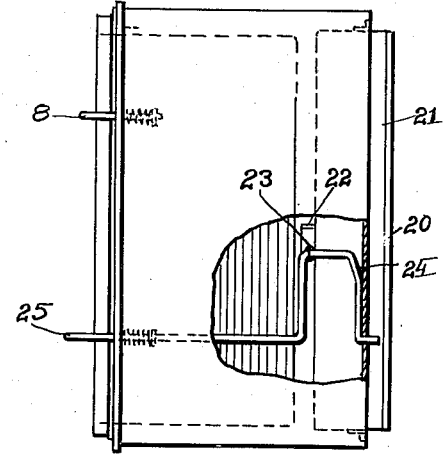
Figure 7 is a side elevation thereof.
Figure 6:
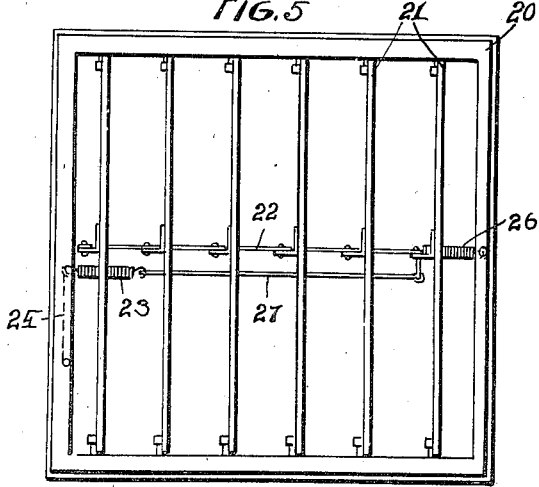
Figure 6 is a rear elevation thereof.
Figure 9:
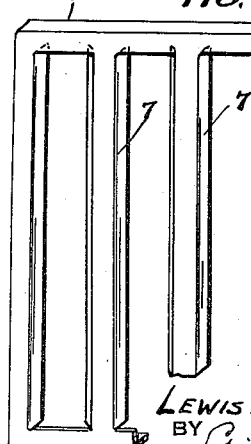
Figure 9 is a detail perspective view of a portion of the panel spacing and locking member of the filter unit housing.

The filter panels are mounted within a suitable filter casing such as is illustrated in Figures 4 to 9 inclusive. This casing is preferably formed of sheet metal and suitable angular guide flanges 5, 5 (Figure 8) are provided at the top and bottom on the inside thereof in order that the filter panels may be arranged and held angularly within the housing as illustrated in Figure 4. This arrangement of the filter panels forms angular pockets into which the air is admitted from the front of the housing and then passes thru the folded filtering cloth of the panels into the angular pockets facing the rear of the filter housing. By this arrangement of the filter panels within the housing a maximum filtering capacity is secured therethru which reduces the velocity of the air passing thru the filtering medium to a minimum.

The filter panels are suitably fastened or taped together at the rear of the filter housing in order to close the joint between the panels. At the front of the housing the panels are locked together by a locking frame 6 which is provided with channel members 7, 7 into which project the outer ends of the filter panels to be suitably spaced and held fixed thereby. The locking frame is held against the outer end of the filter panels by means of the spring operated latch members 8, 8 which are mounted in the housing and are adapted to hook over sides of the locking frame to yieldingly hold the frame against the edges of the filter panels, close the joints between the frame and the housing and hold the panels in a predetermined position in place within the housing.

A filter of maximum capacity is thus made up by the use of a series of the filter panels and these panels may be readily replaced by new ones as soon as they have become clogged with foreign matter in order to keep the filter at a high operating efficiency.

For the purpose of making it possible to remove the panels from the filter housings without interference by an air current, each of the filter housings may be provided with a shutter at the rear thereof. Such a shutter in combination with my filter is illustrated in Figures 4, 5, 6 and 7 and comprises a suitable frame 20 in which are mounted the shutter blades 21, 21. These shutter blades are connected by the connecting link 22 which in turn is connected by means of the spring 23 to the crank shaped lever 24. The lever 24 is formed in the pivot extension of the locking latch 25 which serves as one of the latches for locking the filtering panels and locking frame 6 in place in the filter housings. The crank shaped lever 24 is so arranged with relation to the locking latch that when this latch is turned to hook over the locking frame, the crank shaped lever swings into a position in which the link 22 holds the shutter blades open. However on the turning of the locking latch to release the locking frame, the crank shaped lever is released to allow the spring 26 attached to the connecting link 22 to close the shutter blades. In this way the unlocking of the filter panels for their removal automatically closes the shutter to stop the flow of air thru the filter panels which are to be replaced.

For the purpose of guarding the filter against fire or for shutting off the air current thru the filter to prevent the spreading of a fire from one side of the filter to the other, spring 23 is connected to the connecting link 22 by means of a fusible link 27. This link, when fused by heat, will release the shutter blades from the crank shaped lever 24 and allow the spring 26 to quickly close the shutter without the operation of the locking latch.

I claim:

1. A filter comprising a housing having removable filtering means provided therein, a shutter in said housing for controlling the passage of air thru said filtering means and locking means for locking said filtering means into said housing and shutter operating means for opening said shutter on the operation of said locking means to lock said filtering means into said housing.

2. A filter comprising a housing having removable filtering means mounted therein, a shutter controlling the passage of air thru said housing and said filtering means, releasing means for releasing said filtering means and shutter operating means for closing said shutter on the operation of said releasing means.

3. A filter comprising a housing open at the front and back thereof, a filtering medium mounted in said housing intermediate of the open front and back, a shutter cooperating with said housing at the back thereof, yielding means for operating said shutter to close the open back of said housing and fusible means associated with said yielding means for releasing said shutter to close the back of said housing on the passage of air into the housing having a predetermined high temperature.

4. A filter comprising a housing open at the front and back thereof, a filtering medium mounted in said housing intermediate the open front and back thereof, a shutter co-operating with said housing at the back thereof to control the flow of air thru said housing, manually operated means for opening said shutter and spring means for closing said shutter and a fusible member incorporated in said manually operated means to release said shutter from said manually operated means on the fusing of said fusible member and permit said spring means to close the shutter.

LEWIS L. DOLLINGER.